United States Patent Office 3,346,201
Patented Oct. 10, 1967

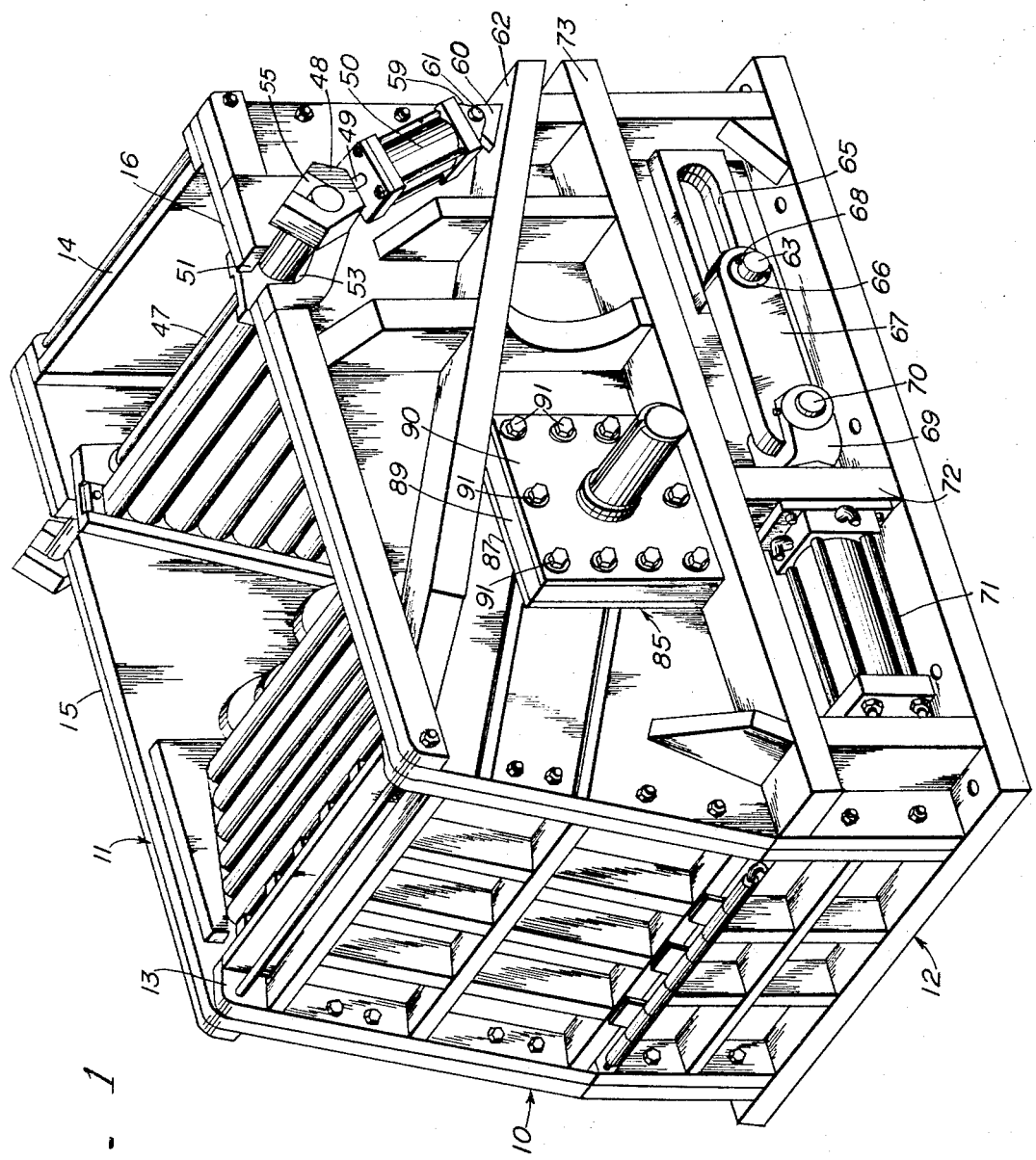

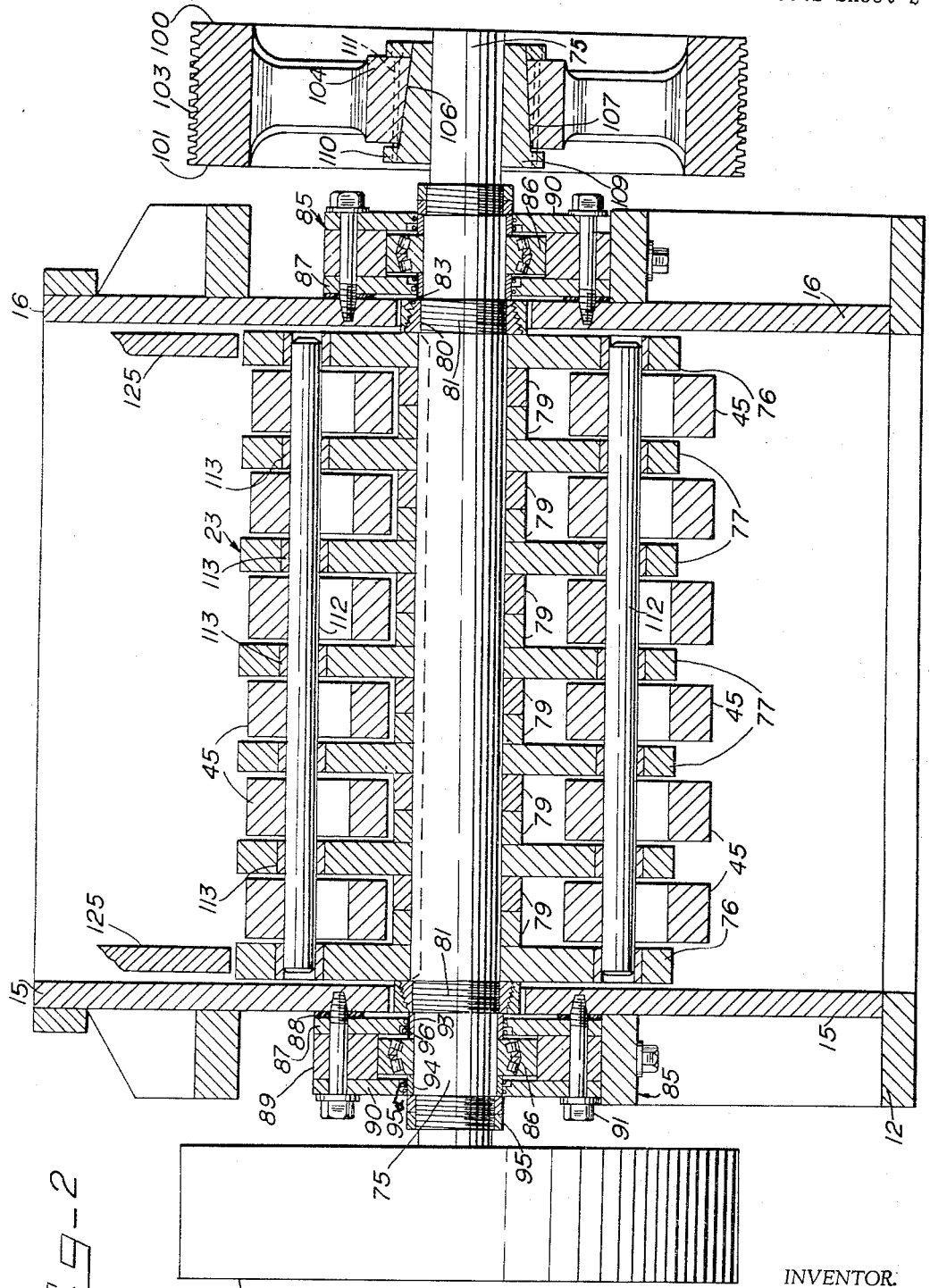

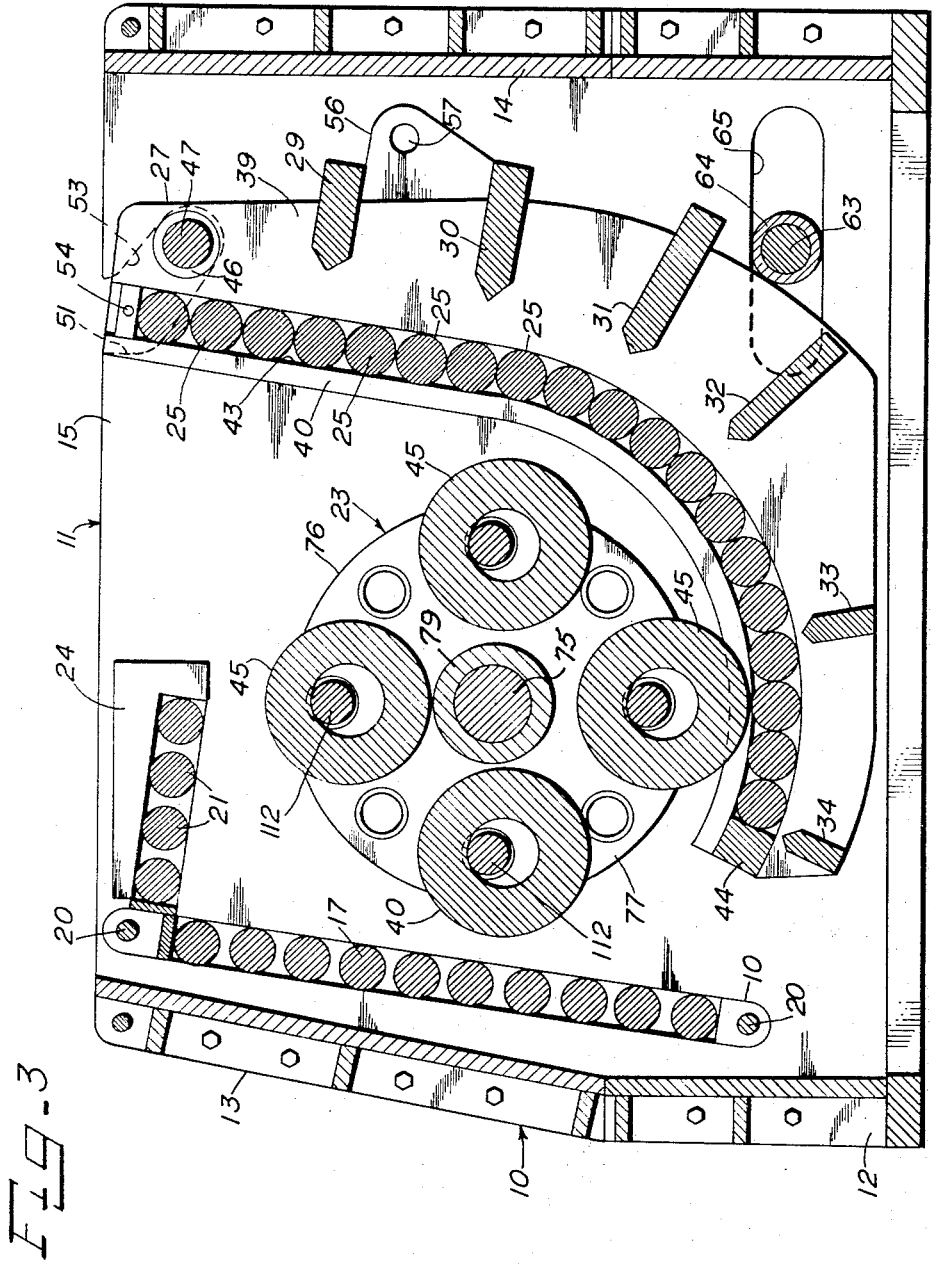

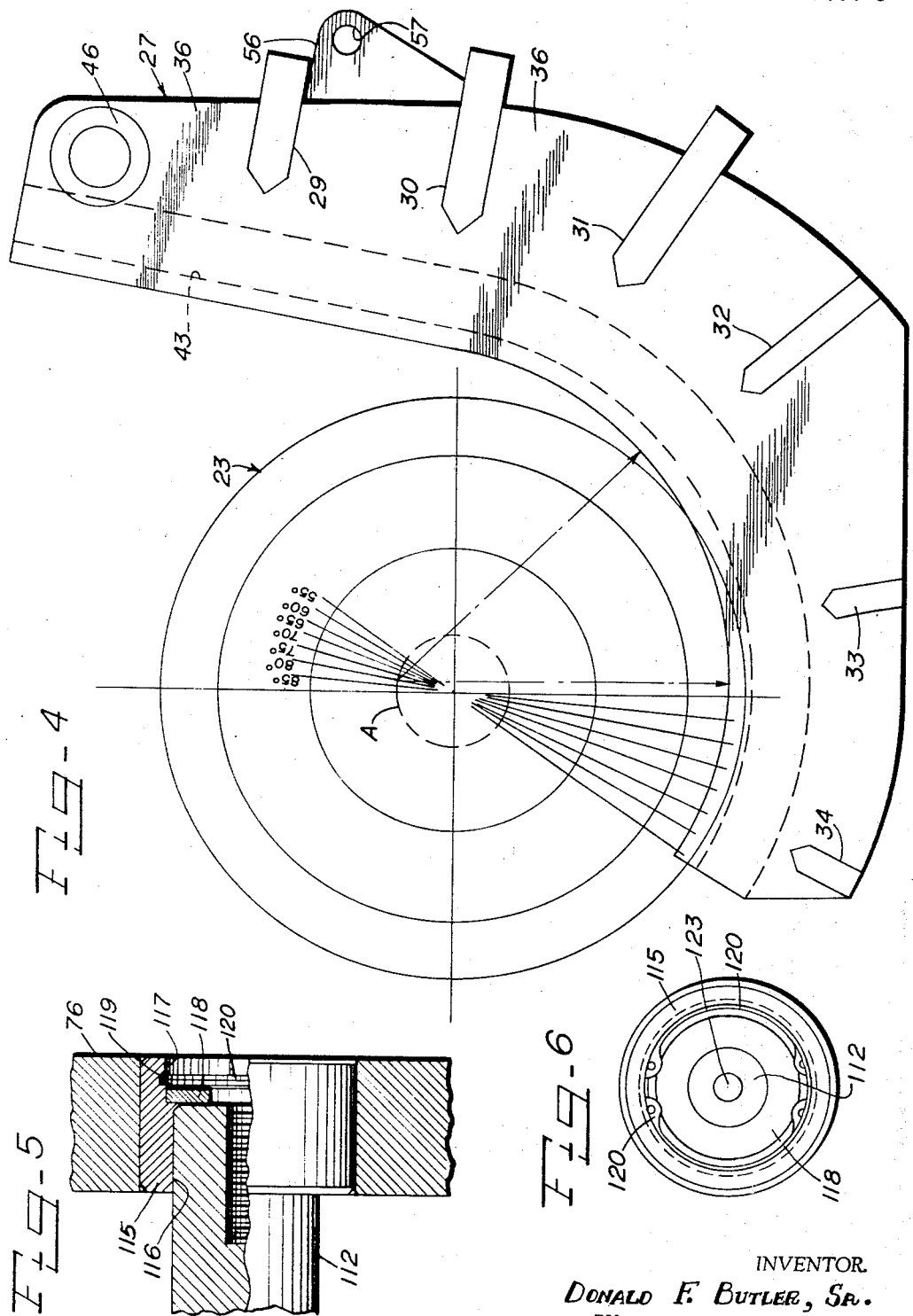

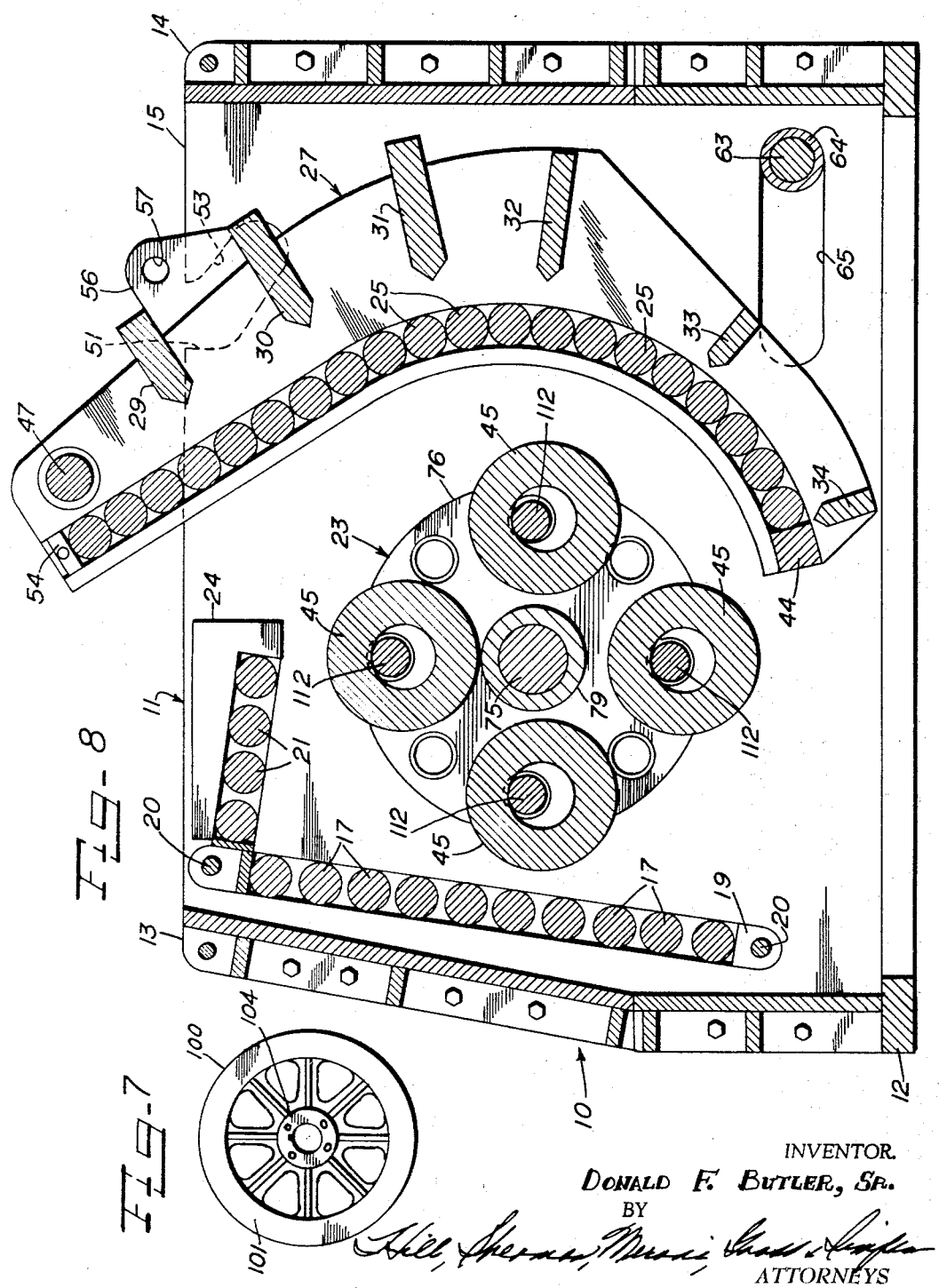

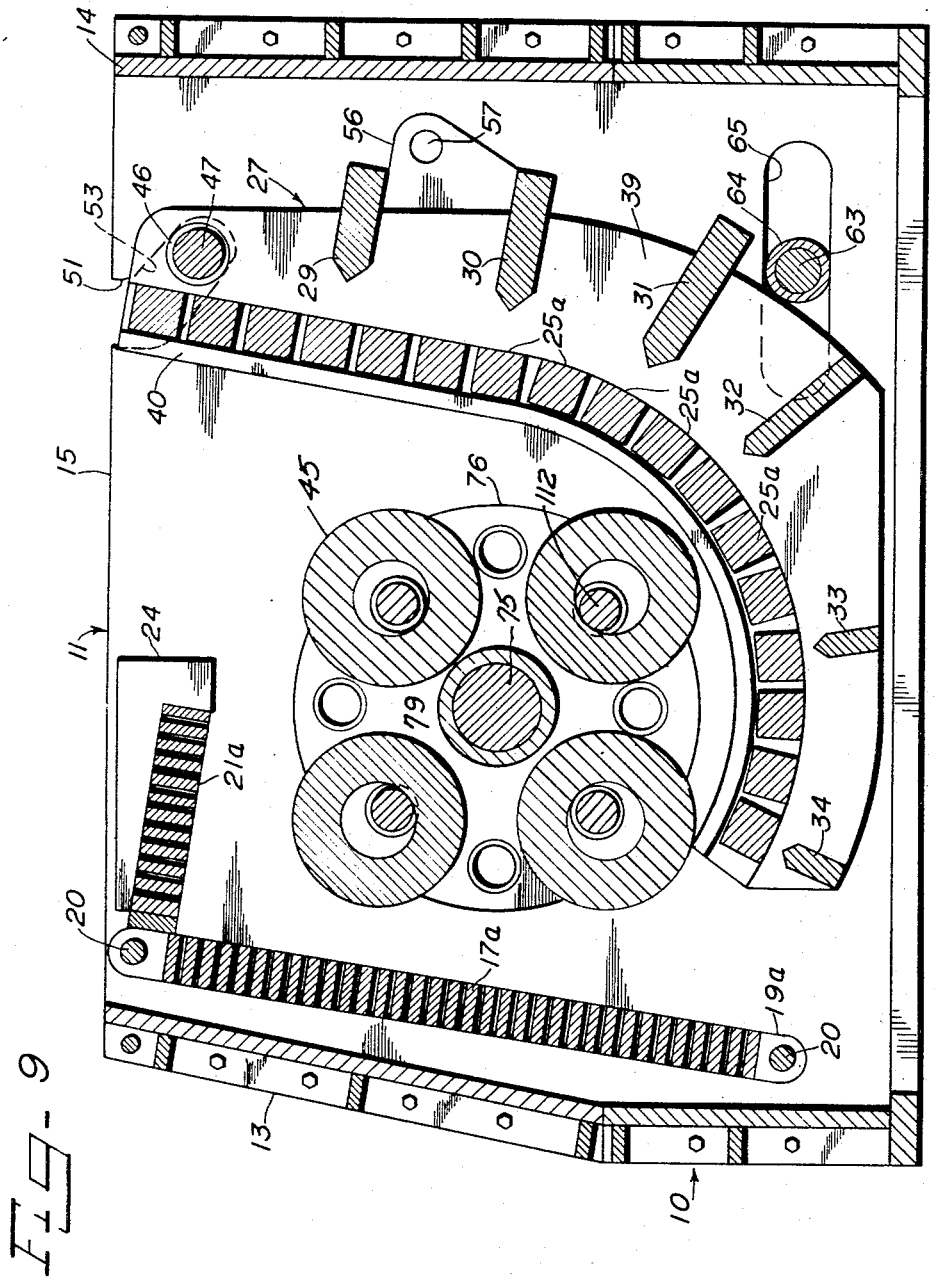

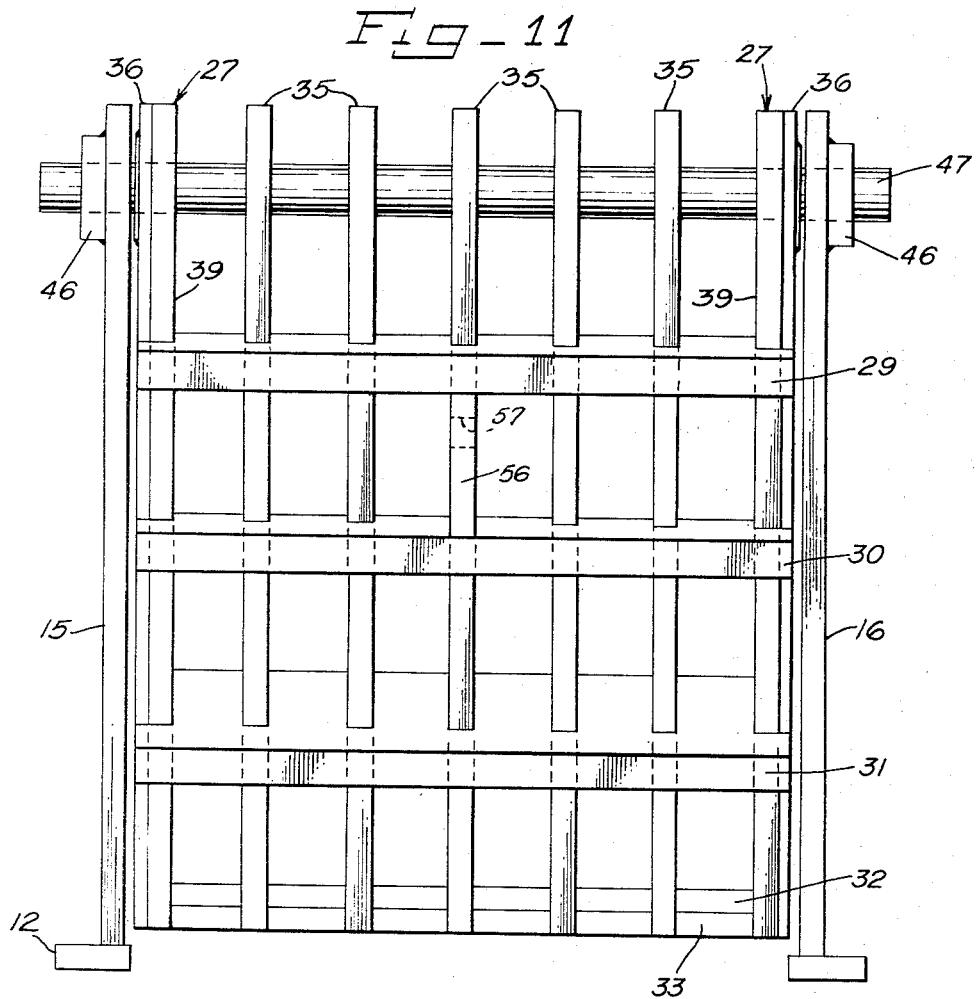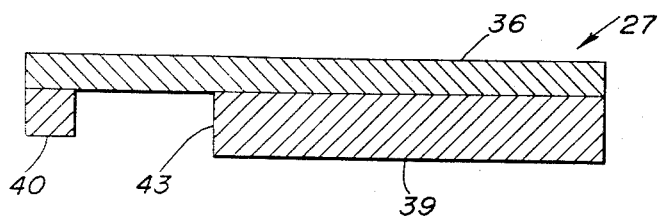

3,346,201
AGGREGATE MANUFACTURING MACHINE
Donald F. Butler, Sr., Box 295,
Franklin Grove, Ill. 61031
Filed Feb. 3, 1964, Ser. No. 342,095
8 Claims. (Cl. 241—189)

This invention relates to improvements in apparatus for making aggregate from aggregate making materials.

A principal object of the invention is to provide a novel and improved form of aggregate maker arranged with a view toward utmost efficiency and simplicity in construction and operation.

A further object of the invention is to provide an improved form of aggregate maker in which the forces of making the aggregate are controlled to provide a uniform aggregate of a preselected grade.

Still another object of the invention is to provide a new aggregate maker having a simple and improved breaker bar assembly so arranged that the types of breaker bars may be varied for different grades of aggregate material to provide a sound and uniform grade of aggregate from various aggregate making materials.

A still further object of the invention is to provide a novel association of breaker bars and orbitally traveling rollers cooperating therewith to provide a controllable precise composition of forces taking raw aggregate material apart along their natural cleavage planes without creating soundness failures in the material.

A still further object of the invention is to provide an improved form of aggregate maker utilizing orbitally traveling rollers cooperating with an improved breaker bar arrangement so formed with respect to the axis of the orbit of the rollers as to avoid destroying the normal hard pieces of rock, but reducing the soft unsound pieces to small particles removed from the aggregate by screening.

A still further object of the invention is to provide a novel and improved form of aggregate maker so arranged that the position of the breaker bar assembly with regard to the roller carrying rotor may be varied under the control of the operator of the machine and so arranged that the breaker bar assembly may be removed without removing the side walls of the machine.

A still further object of the invention is to provide an aggregate maker for reducing rock and stone to sound aggregate by the cooperation of a roller carrying rotor and a breaker bar assembly in which the breaker bar assembly is pivotally supported by the side walls of the apparatus adjacent its upper end and its position with respect to the rotor is varied by hydraulic cylinder and piston means, retaining the breaker bar assembly in position and releasing the breaker bar assembly upon overload of the apparatus, as when tramp iron may be discharged into the aggregate maker along with the stone and rock.

Still another object of the invention is to provide a more rugged roller carrying rotor assembly for aggregate makers and the like in which the rollers are loosely carried between spaced rotor wheels or disks mounted on a shaft, in which the rotor wheels are spaced apart by spacer collars and in which the end rotor wheels are clamped together and locked by self-locking clamping means to provide a shaft having an effective diameter of the outer diameter of the spacer collars.

Still another object of the invention is to provide an improved form of flywheel for aggregate makers and the like in which the greater part of the weight is in the rim of the wheel.

These and other objects of the invention will appear from time to time as the following specification proceeds and with reference to the accompanying drawings wherein:

FIGURE 1 is a perspective view of an aggregate maker constructed in accordance with the principles of the present invention;

FIGURE 2 is a fragmentary transverse sectional view taken through the apparatus and showing the roller carrying rotor in section taken along the axis of its drive shaft;

FIGURE 3 is a longitudinal sectional view of the apparatus showing the breaker bars in operative association with the rollers;

FIGURE 4 is a diagrammatic view illustrating the generation of the curve of the breaker bars;

FIGURE 5 is a fragmentary sectional view illustrating the locking means for the roller carrying shafts to the end disks of the apparatus;

FIGURE 6 is an end view of a bushing carrying an end of the roller carrying shaft showing certain details of the locking means for the shaft to the bushing not shown in FIGURE 5;

FIGURE 7 is an end view of one flywheel for the roller carrying rotor;

FIGURE 8 is a view illustrating the removal of the breaker bar assembly from the housing for the apparatus;

FIGURE 9 is a view somewhat similar to FIGURE 3, but showing the use of rectangular breaker bars in place of the round breaker bars shown in FIGURE 3;

FIGURE 10 is a fragmentary horizontal sectional view taken through an end guide plate supporting the breaker bars; and FIGURE 11 is a fragmentary rear end view of the breaker bar assembly.

In the embodiment of the invention illustrated in the drawings, I have shown in FIGURE 1 an aggregate maker 10 including a housing 11 having a base 12 open at its bottom to accommodate the discharge of material therethrough, end walls 13 and 14 extending upwardly from opposite ends of said base and side walls 15 and 16 connecting said end walls together.

The end wall 13 is shown as having a series of parallel spaced hardened breaker bars 17, 17 spaced inwardly therefrom and extending thereacross. The breaker bars 17 are mounted in carriers 19 at their opposite ends connected between the side walls 15 and 16 on vertically spaced shafts or pins 20, 20 at the upper and lower ends of said carriers and extending between the side walls 15 and 16 and suitably mounted therein. Top hardened breaker bars 21 are shown in FIGURE 3 as extending at right angles to the breaker bars 17 between the side walls 15 and 16 for a portion of the length thereof and over a rotor 23. The top breaker bars are carried in supporting bracket structures 24 suitably mounted on the insides of opposite side walls 15 and 16. The breaker bars 17 and 21 are shown in FIGURE 3 as being round bars. They may, however, be rectangular as shown in FIGURE 9 and may be of various other desired forms. The breaker bars 17 and 21 may be readily removable and the end wall 13 may also be removable or hinged as selected.

Spaced along the housing 11 from the breaker bars 17 and 21 are a series of hardened breaker bars 25, 25, mounted in a breaker bar support structure including parallel spaced end plates 27, 27 connected together by spaced ribs 29, 30, 31, 32, 33 and 34 extending between the end plates 27, 27, generally perpendicular to the plane of the outer surfaces of the breaker bars. The ribs 29 to 34 extend from a plate portion and have slots therebetween the inner margins of which conform to the form of the rear and bottom side of the plate 27 and forming a mounting means for vertical ribs 35 generally conforming to the ribs 27 and abutting the opposite sides of the breaker bars 25 from the rotor 23.

As shown in FIGURES 3 and 10, the opposite end plates 27 are formed from a plate 36 abutting the inside of a side wall for the housing and having a plate 39 on the inner side thereof generally conforming to the plate 36 and stopping short of the inner edge thereof. A rib 40 extends along the inner edge of the plate 36 and with the inner edge of the plate 39 forms a slot receiving the ends of the breaker bars 25.

The plate 36 extends from beneath the rotor 23 in advance of the vertical center line thereof and is uniformly curved. The curve of the plate 36 beneath the rotor 23, and the line of the breaker bars 25 is determined by lines of equal length intersecting a circumferential line A, struck from an axis coaxial with the axis of rotation of the rotor 23. The lines of equal length are spaced along the line A at equal intervals, shown as being intervals of 5° and extend through the axis of rotation of the rotor. These lines serve as radial lines for arcs struck from the points of intersection of said lines with the circumferential line A, which arcs are joined together to form a uniform curve (FIGURE 4).

From the terminal end portion of the plate 36 the arc of the inner edge portion of the plate 36 is struck from a radial line of the same length as the radial lines forming the terminal portion of said plate, the center of which last mentioned radial line is on the circumferential line A and spaced from the vertical center line of the rotor 23 toward the breaker bars 25 an amount shown as being 10°. This constant radius is maintained to substantially a horizontal center line extending through the center of the rotor 23. The balance of the edge of the plate 36 is then a straight line. The inner edge of the plate 39 and of the vertical ribs 35 conform to the contour of the inner edge of the plate 36, and a terminal quadrant 41 of each vertical rib 35 has an inner edge struck from the same centers as the inner edge of the plate 36 to substantially a vertical center line extending through the center of the rotor 23. The inner edge of each vertical rib 35 then curves about a uniform radius to a horizontal center line extending through the center of the rotor 23. From this point the inner edge of each vertical rib 39 is straight and parallel to the inner edge of the plate 36. The space between the inner edge of each plate 39 and the rib 40 thus forms a groove 43 slidably receiving the breaker bars 25. A lower bar 44 is provided to retain the terminal end breaker bars 25 to the groove 43. The top portion of the groove 43 is closed by a closure member 54. Suitable spacer means (not shown) may be provided to space the breaker bars 25 apart where required. This spacing means may be of any well known form and is no part of the present invention so need not herein be shown or described in detail.

As aggregate making material, such as stone or rock is fed into the aggregate maker in the space between the top breaker bars 21 and the breaker bars 25 while the rotor 23 is in operation, the material will pass into the converging space between the rotor 23 and rollers 45, 45 loosely on said rotor, which will wedge the material along said converging space to and beyond the terminal ends of the breaker bars 25 and the rotor 23. This provides a wedging action varying in accordance with the distance from the breaker bars to the rotor and wedges the stone or rock along its cleavage planes rather than crushing the stone into fragments.

The outer end plates 27 having bushings 46 extending therethrough adjacent the upper end portions thereof through which extend a transverse shaft 47. The transverse shaft 47 extends beyond the outer ends of the side plates 27 and forms a support for the breaker assembly in upwardly opening clevises 48 on the upper ends of piston rods 49 extensible from fluid pressure cylinders 50. The shaft 47 extends through upwardly opening slots 51 formed in the side plates 15 and 16 and the clevises 48 hold the shaft to said slots and remove the shaft from said slots when it is desired to remove the breaker asembly from the housing 11.

As shown in FIGURES 1 and 3, the slots 51 have generally vertical entering portions 53 for receiving the shaft 47 which terminate into downwardly inclined portions 54 inclined downwardly toward the end wall 14 of the housing 11.

The clevis 48 has an upwardly opening clot 55 extending generally perpendicular to the inclined portion 53 of the slot 51 and cooperating with the slot 51 to lock the shaft 47 in position in said slot. As fluid under pressure is admitted to the head end of the cylinders 50, the shaft 47 will be moved upwardly along the slots 53 and above the vertical portion thereof. The shaft 47 and the breaker bar assembly carried thereby may then be vertically removed from the housing 11 by upward lifting movement thereon as will hereinafter more clearly appear as this specification proceeds. The center plate 35 has an ear 56 extending therefrom toward the wall 14. The ear 56 has holes 57 extending therethrough to accommodate a clevis or hooke to extend therethrough and lift the breaker bar assembly from the housing 11.

The cylinder 50 is shown in FIGURE 1 as having parallel spaced ears 59 extending along opposite side of an ear 60 and pivotally connected thereto as by a pivot pin 61. The ear 60 is shown as being mounted on an inclined ledge 62 forming a reenforcing bar for the side wall 16. The opposite cylinder 50 is mounted on its side wall 15 in a similar manner.

A means is provided to retain the breaker assembly in position and to adjustably move said breaker assembly with respect to the rotor 23. This means is herein shown as comprising a shaft 63 having a sleeve 64 thereon slidably guided in horizontal slots 65 formed in the side walls 15 and 16. The shaft 63 extends outwardly beyond opposite side walls 15 and 16. Each end of the shaft 63 extends through a bushing 66 formed in a link 67. A cotter key 68 is shown in FIGURE 1 as securing said shaft to said bushing and link. The opposite end of the link 67 from the shaft 63 extends between the furcations of a bifurcated connector 69 and is pivotally connected thereto as by a pivot pin 70. The connector 69 is mounted on the outer end of a piston rod (not shown) extensible from a fluid pressure cylinder 71. The fluid pressure cylinder 71 abuts a partition 72 between the base plate 12 and a ledge 73 of the side wall 16 and is provided to move the shaft 63 and bushing 64 along the horizontal slot 65. Another fluid pressure cylinder like the cylinder 71 is provided on the opposite side of the housing 11 and has connection with the opposite end of the shaft 63. Both ends of the shaft 63 are thus moved together into abutting engagement with the rear edge portions of the end plates 27 and the intermediate vertical ribs 35, for moving the breaker assembly including the breaker bars 25 toward the rotor 23 in predetermined spaced relation with respect to said rotor and for varying the position of said breaker bars in accordance with the size of aggregate to be attained so as to provide an adjustable breaker bar in which the rollers 45 have a varying wedging action with the breaker bars 25 in accordance with the position of adjustment of said breaker bars with respect to said rollers and in accordance with the contour of said breaker bars and particularly at the terminal end portion thereof.

A suitable valve means (not shown) may be provided to admit fluid under pressure to the head and piston rod ends of the cylinders 71 and to hold pressure therein to hold the breaker bars 25 in a selected spaced relation with respect to the rollers 45. The valve means may include an unloading valve (not shown) dumping fluid from the cylinders 71, 71 upon predetermined load conditions to allow the breaker bar assembly to move backwardly with respect to said rollers and to accommodate said rollers to clear themselves as where tramp iron or other unbreakable material may be deposited into the housing 11 along with the aggregate making material. It is, of course, obvious that while I have shown the fluid pressure means for positioning the breaker bar assembly and releasing the breaker bar assembly on overload conditions that the positioning means may be mechanical having a mechanical release (not shown) to release the breaker bar assembly to move backward upon overload conditions.

Referring now to the rotor 23 and the rollers 45 carried thereby, the rotor 23 as shown in FIGURE 2 includes a transverse shaft 75 having a pair of end roller carrying rotor wheel disks 76, 76 secured thereto and disposed inwardly of the side walls 15 and 16 and having a plurality of intermediate roller carrying rotor wheels or disks, 77, 77 spaced therebetween by spacer collars 79, 79. The disks 76, 76 and 77, 77 are keyed or otherwise secured to the shaft 75 in a suitable manner and having a relatively close fit with said shaft as do the spacer collars 79, 79 therebetween. As shown in FIGURE 2, each spacer collar 79 is welded to an associated roller carrying disk and the disks and spacer collars are pressed together by a locking nut structure including a split nut 80 threaded on each threaded, end portion 81 of the shaft 75 into abutting engagement with the outer sides of the adjacent end roller carrying disks 76, 76. The nuts 80 are tightened sufficiently to clamp the disks to the adjacent spacer collars and are then locked by tapered lock nuts 83 threaded on outer tapered surfaces of the split nut 80 and forming a positive locking means for said split nuts on the shaft 75. The collars 79 and disks 76 and 77 are pressed together with sufficient compressive force that the diameter of the shaft in effect between the roller carrying disks 76, 76 is that of the outer diameters of the collars 79, 79 with the result that the shaft has the strength of a shaft of the outer diameter of the spacer collars 79 between the disks 76, 76 providing a rugged rotor shaft capable of withstanding the intermittent forces imparted thereto during continuous rotation of the shaft by the rollers 45, 45.

Bearing housings 85 are mounted on the outsides of the side walls 15 and 16 and house bearings 86 for opposite end portions of the shaft 75. The bearing housings 85 are heat treated to avoid distortion by the heavy stresses to which the machine is subjected during processing of rock into aggregate and include inner plates 87 abutting spacers 88 abutting the outer sides of the respective side walls 15 or 16 and spacing said plates 87 from said side walls. The bearing housings also include blocks 89 having the bearings 86 mounted therein and cover plates 90 abutting the outer sides of said blocks and forming a cover for the bearing housing. The bearing housings are secured to the respective side walls 15 and 16 by locking studs 91 having tapered threaded portions threaded within correspondnig tapered holes in the associated side plate and drawing the annular inner end plate into engagement with the spacer 88, the block 89 into engagement with the outside of the plate 87 and the cover 90 into engagement with the outside of the block 89 and providing a permanent mounting for the associated bearing housing on its associated side wall, locked for the duration of operation of the machine.

Each bearing 86 is spaced from the adjacent split nut 80 by a spacer ring 93 extending within the inner cover plate 87. An outer spacer ring 94 spaces the bearing from lock nuts 95 locking the bearing in position on the shaft 75. Suitable dust and oil seals 95a are contained in the cover 90 and extend about the spacer ring 94 and seal oil within the bearing and prevent dust from entering the bearing. Suitable oil and dust seals 96 are contained within the inner cover 87 and extend about the spacer ring 93 and seal the bearing from dust and contain oil or grease to the bearing. The spacer rings 93 and 94 prevent grooving of the surface of the shaft by the oil seals and thereby lengthen the life of the shaft.

The bearings 86, 86 are thus mounted closely adjacent the side plates 15 and 16, resulting in a shorter shaft than is usual with conventional crushers and thereby lending to the compactness of the apparatus. The outer ends of the shaft 75 have flywheels 99 and 100 mounted thereon. The flywheels 99 and 100 are of a similar construction and are mounted on the ends of the shaft 75 in a similar manner, so one only need herein be shown and described in detail. As shown in FIGURES 2 and 7, the flywheel 100 has an annular rim 101 grooved along its periphery as indicated by reference character 103 to receive V-belts (not shown) for driving said flywheel and the shaft 75. The rim 101 is so proportioned as to contain 65% of the weight of the flywheel and is connected to a hub 104 by a series of integral spokes 105. The spokes 105 are relatively widely spaced to provide an open framework connecting the rim to the hub 104. The hub 104 has a tapered inner surface 106 engageable with a tapered outer periphery 107 of a flanged bushing 109. The flanged bushing 109 has a flange 110 abutting the inner side of the hub 104. The flange 110 is provided with a plurality of circumferentially spaced holes, for receiving threaded cap screws 111 drawing the hub 104 along the inclined surface 106 of the flanged bushing 109 and tightening the flanged bushing 109 to the shaft 75 to drive said shaft. The flywheels 99 and 100 at opposite ends of the shaft thus have a greater portion of the weight at the periphery thereof to provide the required inertia to the shaft 75 and to thereby provide a relatively constant speed of rotation to the rotor 23.

Referring now in particular to the rollers 45 and the means for mounting said rollers between the disks 77, 77, the rollers 45 are herein shown as being of a ring-like form and having circular inner and outer peripheries mounted on pins 112 extending through the disks 77, 77 and retained in position in the end disks 76, 76 in a manner which will hereinafter more clearly appear as this specification proceeds.

While the rollers 45, 45 are shown as being annular and loosely mounted on their shafts, they have a relatively close rolling fit with their shafts. The rollers 45, 45 also may have square, octagonal and various other forms of peripheries, the shape of the rollers being selected for the material to be processed and whether the processing action is to be a roller or hammer-like action. As shown in FIGURE 3, each disk 77 has a plurality of bushings 113 mounted therein in equal radially spaced relation with respect to the center of said disk and in equal angularly spaced relation with respect to each other. The bushings 113 form mountings for the pins 112, freely carrying the rollers 45 between the wheels or disks 77. The end disks 76 have bushings 115 mounted therein forming supports for the ends of the pins 112. As shown in FIGURE 5, each end bushing 115 has an inner peripheral portion 116 of substantially the diameter of the pin 112 and terminating into an enlarged diameter portion 117 having an annular retainer 118 fitting therein into abutting engagement with the end of the pin 112. The enlarged diameter portion 117 has an inwardly opening groove 119 formed therein forming a mounting for a pair of split locking rings 120 fitting in said groove in abutting engagement with each other and having oppositely facing split portions when in position in said groove. Each split locking ring is made from a spring steel and is inserted in the groove 119 by pulling the ends thereof together and then releasing the ends when in the groove to lock said ring in position. The opposite ends of the pins 112 are drilled and tapped as indicated by reference character 123 to accommodate ready removal of said shaft from the disks 76 and 77 and the bushings 115 and 113. The shafts 112 may thus be locked in position in the roller carrying disks 76 and 77 and may readily be removed where it is desired to change the roller pattern to either increase or reduce the number of rollers.

In FIGURE 2, I have shown liner plates 125, 125 spaced inwardly of the side walls 15 and 16 and extending from the end roller carrying disks 76, 76 upwardly along the side walls 15 and 16 and to opposite sides of the rotor 23 to form a liner for said side walls spaced inwardly therefrom to protect the side walls from wear and to accommodate the fine material projected into the space between said liner and side walls to clear itself. It will be noted that the inner cover 87 is spaced from the outside of its associated side wall, that the associated side wall is spaced from the lock nut 83 and the end disk 76 is spaced from its side wall and the liner 125 is also spaced from its side wall. The spacers 88 do not extend clear around the inner covers 87 with the result that the rotor 18 will circulate air inwardly along the inside of the inner cover 87 and draw air into the housing 11 along the inside of the associated liner 125. This will not only provide air for cooling the bearings 86, 86 but will provide a circulation of air to clean the inside of the side liner 125 and prevent the accumulation of fines in the space between said side liner and the inside of the associated side wall 15.

It may be seen from the foregoing that a novel and improved form of aggregate maker has been provided operating on the principle of shearing the aggregate making material along the cleavage planes thereof and shearing the material with a whip-like action.

It may further be seen that the shearing action may be varied by adjusting the position of the breaker bars 25, 25 with respect to the rollers 45, 45 and by the tapered pattern of the breaker bars 25, 25 at the inlet end of the apparatus and the arcuate pattern of said breaker bars, terminating at the terminal end portion of the breaker bar assembly into a curve pattern formed from varying radii to provide a variable wedge breaking action.

It may also be seen that the pattern of the breaker bars 25 in cooperation with the rollers 45 bring the rollers into engagement with the stone with a whip-like action, shearing the sound stone along its cleavage planes and breaking the unsound material and forcing the material between the breaker bars 25, 25 to be subsequently removed by screening.

It may still further be seen that the breaker bars may readily be released upon overload of the apparatus by the simple backward movement of the shaft 63 and sleeve 64 and thereby avoiding overloading of the drive motor for the apparatus and preventing damage to the apparatus, and that the same shaft that releases the breaker bars also serves to position the breaker bars in predetermined relation with respect to the rotor.

It may still further be seen that the breaker assembly may readily be removed from the housing 11 by releasing the shaft 63 by moving said shaft along the slots in a direction away from the rotor and by supplying fluid under pressure to the cylinders 50 and moving the shaft 47 along the slots 43 in position to accommodate a clevis to be hooked to the ears 56 and lift the breaker bar assembly from the housing, as shown in FIGURE 8.

It may still further be seen that rectangular breaker bars 25a, 25a may be substituted for the round breaker bars 25, 25 as shown in FIGURE 9 and that various other forms of breaker bars may readily be used without altering the breaker assembly or the form of the slots 43.

It may still further be seen that an improved form of rotor structure has been provided in cooperation with liner plates, self-cleaning by the rotating action of the rotor and that the rotor not only serves to impel the rollers 45 with a whip-like action to separate the stone along its natural cleavage plane, but also serves to cool the bearings and draw air into the housing to prevent the accumulation of fine material between the housing and side walls thereof, and that the flywheels at opposite ends of the shaft are so constructed as to position a greater part of the weight at the rims of the flywheels, to provide the inertia to assure a constant rotation of the rotor and a soft uniform rolling action which separates the stone along its natural cleavage planes.

It may still further be seen that all parts of the apparatus are readily accessible and are constructed with a view toward ruggedness and quick dismantling with a minimum of disturbance of the parts of the apparatus that are to remain in place during the dismantling operation.

While I have herein shown and described one form in which the invention may be embodied, it may readily be understood that various variations and modifications in the invention may be attained without departing from the spirit and scope of the novel concepts thereof.

I claim as my invention:

1. In an aggregate maker,
a housing having opposite end walls and parallel spaced side walls connecting said end walls together, characterized by a rotor structure rotatably journalled within said side walls and extending therebetween,
a breaker bar assembly within said housing for cooperation with the rotor structure and having a pair of outer plates extending from a postiion disposed at the top of said housing downwardly therealong converging to and extending beneath the rotor structure and having breaker bars extending thereacross,
a pair of horizontally aligned slots in the upper end portions of said side walls having upper ends opening through the tops of said side walls, and having lower ends horizontally misaligned with respect to said upper ends, in a direction away from the rotor,
a transverse shaft mounted in said outer plates and extending beyond opposite sides thereof,
means mounting said shaft in said slots to suspend said breaker bar assembly therefrom,
means abutting the opposite side of said breaker bar assembly from the rotor, and adjustable to bring the breaker bar assembly into preselected spacing with the rotor,
said breaker bar assembly being free to move vertically with respect to said abutment means, and
power means engaging opposite ends of said shaft for moving said shaft along said slots into position to be lifted from the top of said housing.

2. The structure of claim 1,
wherein horizontal slots extend along opposite side walls on the opposite side of the breaker bar assembly from the rotor,
wherein the abutment means includes transverse shaft means slidably guided in said slots, and
wherein hydraulic cylinder and piston means maintain said shaft means in abutting engagement with said breaker bar assembly, and bring said breaker bar assembly into preselected spacing with said rotor.

3. An aggregate maker according to claim 1,
wherein the power means engaging opposite ends of said shaft comprise hydraulic cylinder and piston means mounted on the outer sides of said side walls and having upwardly opening positioning clevises carried thereby having supporting engagement with opposite ends of said shaft and operable to move said shaft along said slots into position to accommodate the lifting of said breaker bar assembly from said housing.

4. The structure of claim 1,
wherein the horizontally misaligned portions of said slots are inclined angularly downwardly toward an end wall of the housing adjacent the breaker bar assembly, and on the opposite side thereof from the rotor, and
wherein the power means has upwardly opening clevises thereon having supporting engagement with opposite ends of said shaft to retain said shaft in fixed relation with respect to said housing and to move said shaft upwardly along the inclined portions of said slots.

5. The structure of claim 4,
wherein the clevises extend in opposite angular relation with respect to the angles of the slots and cooperate therewith to retain said shaft to said slots when in position along the inclined portions of said slots.

6. The structure of claim 5,
wherein the power means comprise hydraulic cylinder and piston means pivoted to said side walls and forming mountings for said clevises at the upper ends thereof.

7. The structure of claim 4,
wherein the abutment means includes transverse shaft means,
wherein horizontal slots extend along opposite side walls adjacent the lower end portions thereof and form supports and rectilinear guide means for said shaft means, and
wherein hydraulic cylinder and piston means maintain said shaft means in abutting engagement with said breaker bar assembly and bring said breaker bar assembly into preselected spacing with respect to said rotor.

8. The structure of claim 1,
wherein the breaker bar assembly is in the form of a uniformly curved surface extending from a terminal position beneath said rotor and upwardly along said rotor to one side thereof at a diverging angle with respect thereto,
wherein the surfaces of said breaker bars facing said rotor extend from said terminal position to an extended vertical line intersecting the axis of rotation of said rotor and are spaced from said rotor distances measured by radial lines of equal length, intersecting the center of said rotor and having spaced centers uniformly spaced along a predetermined circumferential line disposed within the confines of said rotor and having a center coaxial with the axis of rotation of said rotor,
wherein the centers of said radial lines are spaced around said circumferential line substantially 5° apart,
wherein said uniformly curved surface defined by said radial lines extends to an extended vertical line intersecting the axis of rotation of said rotor, and
wherein said uniformly curved surface terminates into a circumferential surface extending from the vertical line intersecting the axis of rotation of the rotor and struck from a center on said circumferential line to one side of said extended vertical line intersecting the axis of rotation of said rotor, and terminates into a straight line surface diverging from said rotor to the upper end portion of said breaker bar assembly adjacent said upwardly opening slots.

References Cited
UNITED STATES PATENTS

| | | |
|---|---|---|
| 1,348,751 | 8/1920 | Searby. |
| 1,770,442 | 7/1930 | Van Cott ............ 241—196 X |
| 1,887,366 | 11/1932 | Williams ............ 241—193 |
| 1,927,207 | 9/1933 | Elzemeyer ......... 241—193 X |
| 1,947,700 | 2/1934 | Elzemeyer ......... 241—189 |
| 2,143,068 | 1/1939 | Hartshorn ......... 241—89 |
| 2,666,589 | 1/1954 | Danyluke ......... 241—196 X |
| 2,960,359 | 11/1960 | Leland ............ 85—8.8 X |
| 3,096,035 | 7/1963 | Allen ............. 241—32 |
| 3,202,367 | 8/1965 | Nixon ............. 241—189 X |
| 3,238,986 | 3/1966 | Butler ............ 151—19 |

ROBERT C. RIORDON, *Primary Examiner.*

D. KELLY, *Assistant Examiner.*